United States Patent
Olk et al.

(10) Patent No.: US 11,919,464 B2
(45) Date of Patent: Mar. 5, 2024

(54) OCCUPANCY DETECTION SYSTEM

(71) Applicants: IEE INTERNATIONAL ELECTRONICS & ENGINEERING S.A., Echternach (LU); NewSouth Innovations Pty Limited, Sydney (AU)

(72) Inventors: Andreas Olk, Welschbillig (DE); David Anthony Powell, Downer (AU)

(73) Assignees: IEE International Electronics & Engineering S.A., Echternach (LU); NewSouth Innovations Pty Limited, Sydney (AU)

( * ) Notice: Subject to any disclaimer, the term of this patent is extended or adjusted under 35 U.S.C. 154(b) by 0 days.

(21) Appl. No.: 17/788,662

(22) PCT Filed: Dec. 17, 2020

(86) PCT No.: PCT/EP2020/086816
§ 371 (c)(1),
(2) Date: Jun. 23, 2022

(87) PCT Pub. No.: WO2021/130105
PCT Pub. Date: Jul. 1, 2021

(65) Prior Publication Data
US 2023/0031035 A1    Feb. 2, 2023

(30) Foreign Application Priority Data
Dec. 23, 2019  (LU) .................... LU101574

(51) Int. Cl.
*B60R 21/015*    (2006.01)
*B60N 2/00*      (2006.01)
(Continued)

(52) U.S. Cl.
CPC ........ *B60R 21/01534* (2014.10); *B60N 2/002* (2013.01); *G01S 13/42* (2013.01);
(Continued)

(58) Field of Classification Search
CPC ... B60R 21/01534; B60N 2/002; G01S 13/42; G01S 13/56; H01Q 1/3233; H01Q 15/0006
See application file for complete search history.

(56) References Cited

U.S. PATENT DOCUMENTS

| 5,873,597 A * | 2/1999 | Sim .................. B60R 21/01534 280/727 |
| 7,724,180 B2 | 5/2010 | Yonak et al. |

(Continued)

FOREIGN PATENT DOCUMENTS

| CN | 110783692 B * | 3/2021 | ............ H01Q 1/242 |
| DE | 10237331 A1 | 3/2004 | |
| WO | 2015086346 A1 | 6/2015 | |

OTHER PUBLICATIONS

Pfeiffer Carl et al.; "Millimeter-Wave Transmitarrays for Wavefront and Polarization Control", IEEE Transactions on Microwave Theory and Techniques, Plenum, USA,, vol. 61, No. 12, Dec. 1, 2013, pp. 4407-4417.

(Continued)

*Primary Examiner* — Donald HB Braswell
(74) *Attorney, Agent, or Firm* — Reising Ethington P.C.

(57) ABSTRACT

An occupancy detection system for at least one vehicle seat includes: an antenna arrangement having an antenna; a control device that applies a radio-frequency transmission signal to, and receives a response signal from, the antenna arrangement; and a transmit array having a plurality of structured metallic layers disposed above each other and extending laterally, each two neighbouring metallic layers isolated from each other by an intermediate dielectric layer. The antenna arrangement transmits a radio-frequency transmission field through the transmit array onto the vehicle seat in response to the transmission signal and receives a radio-frequency response field through the transmit array to gen- (Continued)

erate the response signal. The transmit array is adapted to refract at least one of the transmission field and the response field. The transmit array has a receive section that focuses a response field from a position of a vehicle seat to a position of a receive antenna.

14 Claims, 5 Drawing Sheets

(51) Int. Cl.
    *G01S 13/42*     (2006.01)
    *G01S 13/56*     (2006.01)
    *H01Q 1/32*     (2006.01)
    *H01Q 15/00*     (2006.01)

(52) U.S. Cl.
    CPC ........... *G01S 13/56* (2013.01); *H01Q 1/3233* (2013.01); *H01Q 15/0006* (2013.01)

(56) References Cited

U.S. PATENT DOCUMENTS

| | | | |
|---|---|---|---|
| 2007/0171127 A1* | 7/2007 | Mizugaki | H01Q 21/065 |
| | | | 343/700 MS |
| 2008/0142713 A1* | 6/2008 | Breed | B60R 21/01526 |
| | | | 250/330 |
| 2019/0015277 A1* | 1/2019 | Sauser | A61B 5/0507 |
| 2019/0393616 A1* | 12/2019 | Pelletti | H01Q 21/065 |
| 2020/0058987 A1* | 2/2020 | Pelletti | G01S 13/931 |
| 2021/0257739 A1* | 8/2021 | Mathews | H01Q 21/065 |

OTHER PUBLICATIONS

International Written Opinion corresponding to International Application pplication PCT/EP2020/086816; dated Jan. 28, 2021; 5 pages.

Search Report corresponding to International Application PCT/EP2020/086816; dated Jan. 28, 2021; 4 pages.

N. Yu et al., "Light propagation with phase discontinuities: generalized laws of reflection and refraction.," Science (New York, N.Y.), vol. 334, No. 6054, pp. 333-337, Oct. 2011, 29 pages.

G. Lavigne, K. Achouri, V. Asadchy, S. Tretyakov and C. Caloz, "Susceptibility Derivation and Experimental Demonstration of Refracting Metasurfaces Without Spurious Diffraction," IEEE Transactions on Antennas and Propagation, vol. 66, No. 3, 2018, pp. 1321-1330.

A. Epstein and G. V. Eleftheriades, "Huygens metasurface via the equivalence principle: design and applications," Journal of the Optical Society of America B, vol. 33, No. 2, p. A31, 2016, 20 pages.

M. A. Cole, A. Lamprianidis, I. V. Shadivov and D. A. Powell, "Refraction efficiency of Huygens' and bianisotropic metasurfaces," arXiv, vol. 1812.04725, 2018, 15 pages.

A. E. Olk and D. A. Powell, "Accurate metasurfaces synthesis incorporating near-field coupling effects," Phys. Rev. Applied, vol. 11, No. 6, p. 064007, Jun. 2019, 10 pages.

* cited by examiner

OCCUPANCY DETECTION SYSTEM

TECHNICAL FIELD

The invention relates to an occupancy detection system for at least one vehicle seat.

BACKGROUND

Reliable occupancy detection of vehicle seats in a vehicle like a car can be required due to a variety of reasons. Depending on the occupancy of a seat, seat belt reminders can be triggered or the air bag function can be adapted. Occupancy and detection and classification systems known in the art are often foil-based sensors, which are integrated in every single seat and are adapted for detecting pressure. More recently, occupancy detection systems have also been implemented with a radar sensor which is mounted at the ceiling of the car. There are several advantages of using radar sensors for occupancy detection. They do not require installation into the individual seat, thereby also eliminating any cables running into the seats. This greatly simplifies interior car designs where seats can be folded down, rotated or adjusted in a wide range. Additionally, radar sensors which measure Doppler frequency shifts can provide information on the movement of the target, thus enabling an inanimate object to be distinguished from a person.

However, radar sensors designed for occupancy detection as known in the art often require one sensor per seat. If two or more seats should be observed with one radar sensor, comparatively complex radar systems with high angular resolution are required. According to prior art, this is normally solved by employing MIMO (multiple input multiple output) radar. While these systems are sufficiently reliable, they are complex and expensive. For instance, reliable detection for two vehicle seats normally requires two or three transmit antennas and four receive antennas. The complexity may increase if more than two vehicle seats are to be detected with a single radar sensor.

SUMMARY

It is thus an object of the present invention to provide efficient means for accurate radar-based occupancy detection in a vehicle. This problem may be solved by an occupancy detection system according to claim 1.

The invention provides an occupancy detection system for at least one vehicle seat. The vehicle seat is normally a seat in a road vehicle like a passenger car or a truck. It may be a rear seat or a front seat and the term "seat" includes separate seats as well as rear bench seats. In case of several vehicle seats, these may be front seats and/or rear seats. The system is at least adapted to determine whether the respective vehicle seat is occupied by an object or a person. Preferably, the system is furthermore adapted to classify the occupant, i.e. distinguish a person from an inanimate object. Additionally, the system may be adapted for vital sign monitoring, i.e. detection of basic health parameters of an occupant such as respiration rate, respiration pattern and/or heart rate. Without being limited to this configuration, the system may at least partially be disposed in or underneath a ceiling of the vehicle.

The system comprises an antenna arrangement, comprising at least one antenna. As will be explained later, the antenna arrangement normally comprises a plurality of antennas, e.g. at least one transmit antenna (T1) and at least one receive antenna (R1, R2), but may be implemented using a single antenna. Each antenna may also be referred to as a radar antenna and is configured to emit and/or receive an electromagnetic signal having a radar frequency or radio frequency. In at least some embodiments of this invention a "radio frequency" may in particular be between 20 GHz and 350 GHz. In particular, each antenna may be a simple, non-directional antenna that is configured to emit the signal in all directions and/or to receive the signal from all directions. For instance, each antenna may be a patch antenna on a printed circuit board.

Furthermore, the system comprises a control device adapted to apply a radio-frequency transmission signal to the antenna arrangement and to receive a response signal from antenna arrangement. The transmission signal has a radio frequency, which includes the possibility that it comprises a plurality of radio frequencies. In particular, this may be at least one frequency from the W band (75-110 GHz). It is understood that the control device is suitably connected to the antenna arrangement in order to apply the transmission signal and that it comprises suitable components, like a radio frequency generator, to generate the transmission signal. Also, the control device is adapted to receive a response signal from the antenna arrangement, which implies that it is electrically connected in a suitable manner. Optionally, the control device may be adapted to process, analyse and/or evaluate the response signal. While reference is made here to "a" transmission signal and "a" response signal, this is to be understood as referring to at least one signal, i.e. if the antenna arrangement comprises a plurality of antennas, different transmission signals may be applied to different antennas and generally different response signals can be received from different antennas.

The system also comprises a transmit array comprising a plurality of structured metallic layers disposed above each other and extending laterally, each two neighbouring metallic layers isolated from each other by an intermediate dielectric layer. The metallic layers are disposed above each other and extend laterally, wherein the terms "above" and "laterally" are not to be construed in any limiting way as to the orientation of the transmit array with respect to the direction of gravity. Rather, these terms simply refer to the arrangement of the layers within the transmit array. Each metallic layer may be disposed along a plane and maybe offset from a neighbouring metallic layer in a direction perpendicular to this plane. However, it is conceivable that at least one metallic layer (or all metallic layers) could be disposed along a curved face. Each metallic layer is structured, which means that it is not a single, uninterrupted object, but is perforated and/or comprises a plurality of separate elements, which are arranged as one layer. More specifically, one could say that each metallic layer is laterally structured. Each metallic layer comprises at least one metal, e.g. copper or silver. Optionally, the metallic layer could also comprise half-metal or non-metal components, e.g. as part of an alloy or as part of a metallic ink comprising metal particles and a binder. The same metallic material may be used for all metallic layers. Each two neighbouring metallic layers are separated by a dielectric layer, i.e. a layer made of at least one dielectric material. Each dielectric layer may be composed of different materials forming sub-layers. These sub-layers can also be considered as dielectric layers so that two metallic layers are separated by a plurality of dielectric layers. Thus, the two metallic layers being separated by "a" dielectric layer is to be understood as two metallic layers being separated by at least one dielectric layer. In some embodiments, the relative permittivity $\in_{r,s}$ of each dielectric layer (the index "s" referring to "substrate")

can be between 2.0 and 4.0, and more specifically between 2.5 and 3.5. In contrast to the metallic layers, each dielectric layer is normally a solid, non-perforated body without lateral structure. Since the metallic layers are structured, two dielectric layers on opposite sides of a metallic layer are at least partially in contact with each other, namely where the metallic layer is interrupted. As will be discussed further below, the thickness of any dielectric layer is normally considerably greater than the thickness of any metallic layer. Preferably, the transmit array comprises at least three metallic layers and correspondingly at least two dielectric layers.

The antenna arrangement is adapted to transmit a radio-frequency transmission field through the transmit array onto the at least one vehicle seat in response to the transmission signal and to receive a radio-frequency response field through the transmit array to generate the response signal, and the transmit array is adapted to refract at least one of the transmission field and the response field. According to an embodiment of the invention the transmit array comprises at least one receive section adapted to focus a response field from a position of a vehicle seat to a position of a receive antenna. In other words, the receive section works as a focusing lens for the response field. When the transmission signal is applied to the antenna arrangement, the antenna arrangement transmits a radio-frequency transmission field through the transmit array onto the at least one vehicle seat. In other words, the signal is emitted by the antenna arrangement, passes through the transmit array and finally reaches the at least one vehicle seat (and/or an object placed on this vehicle seat). Of course, the transmission field is an electromagnetic field or electromagnetic wave, respectively. Apart from the transmission field, some of the emissions of the antenna arrangement may not be directed at the transmit array and may therefore not reach the vehicle seat. It is also possible that some of the emissions passing through the transmit array do not reach the vehicle seat. Also, the antenna arrangement is adapted to receive a response field through the transmit array. It is understood that the response field is a portion of the transmission field that is reflected—e.g. by the at least one vehicle seat or an object on the vehicle seat—back onto the transmit array and onto the antenna arrangement. In this context, it is possible that a portion of the reflected field which impinges on the transmit array does not reach the antenna arrangement and therefore does not contribute to the response field. As the response field reaches the antenna arrangement, the response signal is generated.

The transmit array is adapted to refract at least one of the transmission field and the response field. Normally, both signals are refracted by the transmit array. In general, refraction may refer e.g. to changing the direction in which the signal propagates as a whole or to changing the direction of portions of the signal in different ways, thereby changing the shape of the signal, i.e. its spatial distribution. In particular, the signal may be focused, diverged, collimated and/or redirected. These effects are due to a phase change in the signal caused by passage through the transmit array. This can be an abrupt phase change, i.e. a phase change that occurs over the scale of a wavelength. Insofar, the term "refraction" in this context is to be understood as a process that can be described the generalized laws of reflection as outlined e.g. in N. Yu et al., "Light propagation with phase discontinuities: generalized laws of reflection and refraction.," Science (New York, N.Y.), vol. 334, no. 6054, pp. 333-7, October 2011. The transmit array is adapted to achieve a desired transmission phase or phase response for the respective signal. This phase response may in particular depend on the (lateral) location within the transmit array if the (micro-)structure of the transmit array depends on the (lateral) location. While this is not to be construed in any limiting way, the transmit array can also be regarded as a metamaterial or a metasurface. The use of such metamaterials or metasurfaces for refracting radio-frequency signals has been described e.g. in the following scientific publications: C. Pfeiffer and A. Grbic, "Millimeter-Wave Transmitarrays for Wavefront and Polarization Control," *IEEE Transactions on Microwave Theory and Techniques,* vol. 61, no. 12, p. 4407, 2013 (hereinafter referred to as Pfeiffer et al.), G. Lavigne, K. Achouri, V. Asadchy, S. Tretyakov and C. Caloz, "Susceptibility Derivation and Experimental Demonstration of Refracting Metasurfaces Without Spurious Diffraction," *IEEE Transactions on Antennas and Propagation,* vol. 66, no. 3, pp. 1321-1330, 2018 (hereinafter referred to as Lavigne et al.), A. Epstein and G. V. Eleftheriades, "Huygens metasurface via the equivalence principle: design and applications," *Journal of the Optical Society of America B,* vol. 33, no. 2, p. A31, 2016 (hereinafter referred to as Epstein et al.), M. A. Cole, A. Lamprianidis, I. V. Shadivov and D. A. Powell, "Refraction efficiency of Huygens' and bianisotropic metasurfaces," *arXiv,* vol. 1812.04725, 2018 (hereinafter referred to as Cole et al.) as well as A. E. Olk and D. A. Powell, "Accurate metasurfaces synthesis incorporating near-field coupling effects," Phys. Rev. Applied, vol. 11, no. 6, p. 064007, June 2019 (hereinafter referred to as Olk et al.).

The structured metallic layers comprise metallic structures that are smaller than the wavelength of the radar signals. The respective signal is at least not entirely reflected but at least partially refracted by the transmit array, which is at least partially due to the structure of the metallic layers. In general, the inventive use of the transmit array allows effectively directing the transmission field onto the at least one vehicle seat and/or effectively directing the response field to the antenna arrangement (or to a specific antenna). Since directing the respective signal is achieved through the transmit array, the antenna arrangement itself does not require any means for directing the signal. In particular, any antenna of the antenna arrangement may be a non-directive antenna. Therefore simple, low-cost antennas can be used which helps to reduce costs. Also, a high number of antennas for beam-forming like in a MIMO system is unnecessary. Also, the transmit array can be produced at low costs. Since directing of the signal is achieved by the transmit array, it is possible to use one and the same antenna arrangement in combination with different transmit arrays in order to adapt to the shape, size and position of the vehicle seat(s) in various vehicle models.

According to one embodiment, the transmission signal is a continuous-wave signal. In this case, the transmission signal can be characterized by a single frequency and corresponds to a sinusoidal oscillation. It is understood that the transmission field has the same time-evolution and therefore corresponds to a continuous wave. In this embodiment, it may be impossible to deduce any range information from an analysis of the response signal, although this may be possible depending on the number and arrangement of antennas. Even without range information, occupancy of a vehicle seat can be detected by detecting motion via analysis of the Doppler shift of the response signal. According to another embodiment, the transmission signal is a frequency-modulated signal, in particular a frequency-modulated continuous wave (FMCW) signal. Normally, the frequency of the signal is changed periodically, e.g. by applying a linear chirp (linear frequency change). However, a non-linear frequency change may be applied as well as a non-periodical frequency change. In this embodiment, range information can be deduced from a comparison of the transmission signal and the response signal. At the same time, motion can be detected by analyzing the range as a function of time. According to another embodiment, the transmission signal can be a modulated pulse signal, in particular an amplitude-modulated pulse signal. Like with a frequency-modulated signal, range information can be deduced from analysis of the response signal, basically by analyzing the delay between the emission of a pulse and the detection of the reflected pulse. Various types of envelope may be used for modulating the pulse, e.g. rectangular, sinusoidal, Gaussian or the like. As mentioned above, if the antenna arrangement comprises a plurality of antennas, a transmission signal may be applied to several antennas, in which case a different transmission signal may be applied to each antenna. For example, the transmission signals are applied to different antennas could differ by a time offset. It is understood that motion detection also allows for life sign monitoring.

E.g. if a pulse signal is used, the antenna arrangement could comprise a single antenna that emits the transmission field and receives the response field. It is mostly preferred, though, that the antenna arrangement comprises at least one transmit antenna and at least one receive antenna and the control device is adapted to apply a transmission signal to each transmit antenna and receive a response signal from each receive antenna. Normally, all antennas are laterally offset from each other or even laterally spaced from each other in order to reduce the risk of electromagnetic interference. As mentioned above, the control device may apply different transmission signals to different transmit antennas (if present). It is understood that generally different response signals are received from different receive antennas (if present).

According to a highly preferred embodiment, the system is adapted for occupancy detection in a plurality of seats and comprises a number of antennas that is greater than a number of seats. Such an occupancy detection system for a plurality of seats can very effectively detect occupancy of one specific seat, which is due to the refracting properties of the transmit array. This enables a detection accuracy that can otherwise only be achieved with more complex and/or more expensive systems like a MIMO (multiple input multiple output) detection system. For occupancy detection of e.g. two seats, an effective MIMO system requires normally at least two or three transmit antennas and four receive antennas. By using the inventive transmit array, it has been shown that selective occupancy detection for two seats is possible with a single transmit antenna and two receive antennas. As will be discussed in greater detail below, the transmit array may be arranged so that the transmission field covers both vehicle seats while the "field of view" of each receive antenna (i.e. region from which the receive antenna can receive the response field) is (mostly) limited to a single seat. According to one embodiment, the system comprises a single transmit antenna and a plurality of receive antennas, wherein the number of receive antennas is equal or greater than the number of vehicle seats (for which occupancy detection is intended), i.e. in case of two vehicle seats, at least two receive antennas are required. It should be noted, though, that the system works reliably if the number of receive antennas is equal to the number of seats. According to another embodiment, the system comprises one receive antenna and a plurality of transmit antennas. In this embodiment, the field of view of the receive antenna has to cover all vehicle seats, i.e. the transmit array should be adapted to direct a response field originating from any of the vehicle seats to the location of the receive antenna. On the other hand, the transmit array should be adapted to direct the transmission field emitted by one transmit antenna to the location of a single, specific seat. In this embodiment, a multiplexing method can be applied to the transmission signals for the various transmit antennas, e.g. time multiplexing where the transmission signals are applied sequentially. In this embodiment, the number of transmit antennas should be greater or equal to the number of vehicle seats.

As will be understood by the explanations above, an optimum refraction characteristic of the transmit array for directing the transmission field from the at least one transmit antenna to the at least one vehicle seat is generally different from an optimum refraction characteristic for directing the response field to the at least one receive antenna. It is therefore preferred that the transmit array comprises at least one transmit section and at least one receive section laterally offset from each transmit section, wherein each transmit antenna is disposed over a transmit section and adapted to transmit the transmission field therethrough and each receive antenna is disposed over a receive section and adapted to receive the response field therethrough. Again, the terms "over" and "laterally" are to be understood in the same sense as regarding the arrangement of the layers of the transmit array. It is understood that each transmit section has a refraction characteristic that is adapted for directing the transmission field from the respective transmit antenna to the relevant vehicle seat(s). Likewise, each receive section has a refraction characteristic that is adapted for directing the response field from the relevant vehicle seat(s) to the respective receive antenna.

As stated above, at least one receive section can be adapted to focus a response field from a position of a vehicle seat to a position of a receive antenna. In other words, the receive section works as a focusing lens for the response field. It is possible to define a focal length to the receive section. In this embodiment, the distance of the receive antenna from the receive section corresponds to the focal length and its lateral position is adapted so that a wave reflected from the relevant vehicle seat is refracted by the receive section and focused onto the position of the receive antenna. This embodiment greatly helps to selectively detect the response field originating from a particular vehicle seat. Possible interference from other sources is reduced and the signal strength can be enhanced by the focusing effect.

Preferably, a thickness of a metallic layer is less than 25 µm, more preferably less than 20 µm. While this thickness is absolutely sufficient to support the intended refractive effect, it helps to achieve a sufficient resolution e.g. in a PCB lithography process. A (total) thickness of the transmit array can preferably be between 300 µm and 600 µm. It will be understood that this thickness is negligible in comparison with the dimensions of the vehicle, and which helps to facilitate integration of the detection system e.g. into a ceiling of the vehicle. The thickness of a single dielectric layer can be between 150 µm and 300 µm.

Preferably, each metallic layer extends laterally along a first direction and a second direction perpendicular to the first direction and comprises a plurality of resonator structures, each two neighbouring resonator structures being spaced-apart along at least one of the first direction and the second direction. As mentioned above, the metallic layers normally extend along a plane, so that the first direction and the second direction correspond to two perpendicular axes defining this plane. Each metallic layer comprises a plurality of resonator structures, wherein neighbouring resonator structures are separate from each other along at least one of the abovementioned directions, i.e. there is a spacing between these structures along at least one direction. According to one embodiment, each resonator structure is a metallic resonator. These metallic resonators are distinct, separate metallic structures (within the metallic layer). If two neighbouring resonators are considered, these are spaced apart along the first direction, the second direction or both. According to another embodiment, each resonator structure is a resonator aperture in a coherent metallic layer. In this case, the metallic layer is coherent or contiguous, but comprises a plurality of apertures, recesses or holes. Each two neighboring resonator apertures are spaced along at least one of the abovementioned directions, i.e. they are separated by the metal of the metallic layer. The dimensions of the resonator structures and the spacing in between two resonator structures of course depend on the desired refraction characteristic. The optimum configuration of the resonators can e.g. be found by techniques described by Epstein et al., Cole et al. and in particular Olk et al. These or similar techniques can be used to find the optimum configuration for resonator apertures.

According to a preferred embodiment, the transmit array comprises a plurality of cells offset from each other, each cell comprising a top resonator structure, a middle resonator structure and a bottom resonator structure disposed above each other. It should be understood that the cells are usually not clearly separated from each other by any physical features. Rather, the transmit array can conceptually be divided into cells. Each cell comprises three resonators structure, namely a top resonator structure that is part of a first layer or top layer, a middle resonator structure that is part of a second layer of middle layer and a bottom resonator structure that is part of a third layer or bottom layer. The top resonator structure is separated from the middle resonator structure by a dielectric layer and the middle resonator structure is separated from the bottom resonator structure by another dielectric layer. Each of the cells can be adapted individually to achieve a desired transmission phase or phase response $\phi_i$ for a respective cell i. In particular, the shape and/or the dimensions of the resonator structures and their spacing can be adapted to influence the phase response. Most commonly, the cells are arranged in a Cartesian or rectangular pattern. Preferably, a lateral dimension of each cell along each of the first direction and the second direction is between 600 µm and 2.5 mm. In particular the top, middle and bottom resonator structure can be a (metallic) top, middle and bottom resonator, respectively. However, they could also be top, middle and bottom resonator apertures.

Various designs of the individual cells are possible, and the invention is generally not restricted to any particular design or specific configuration. According to one preferred embodiment, in each cell, a shape and size of the top resonator and the bottom resonator are identical. In other words, if a cell is considered individually, the top resonator structure has the same shape and size as the bottom resonator structure. When considering different cells, the top resonator structures in the cells may have different sizes and/or shapes. The middle resonator structure, though, of each cell may have a different size and/or shape than the top resonator structure and the bottom resonator structure.

As mentioned above, the phase response of an individual cell, among others, depends on the shape and size of the resonators in this cell. On the other hand, the phase responses of all cells in the transmit array or all cells in a (transmit or receive) section determine the refractive properties of the transmit array of the section, respectively. For example, in order to achieve a focusing effect as described above, the phase responses need to be adjusted individually for different cells. According to one embodiment, at least two vehicle seats are offset along one of the first and second direction and at least one dimension of one resonator structure varies for different cells along this direction. For instance, the transmit array may be installed so that first direction may correspond to the Y-axis of the vehicle. If the system is intended to detect occupancy of two seats that are offset along the Y-axis, at least one dimension of one resonator structure (e.g. the top resonator structure) is different for different cells along the first direction. One could also say that a specific phase response profile is established along the first direction by individually adapting the resonator structure of different cells along this direction. It should be noted that the phase response profile and therefore the design of the resonator structure as a function of the cell position along the first direction is normally different for a receive section as compared to a transmit section and may also be different for different receive sections or transmit sections, respectively.

According to a preferred embodiment, every resonator structure comprises an elongate central portion aligned along one of the first direction and two end portions connected to the central portion and aligned along the other direction. The general shape of the resonator structure corresponds to a double-T or a dog bone in case of a metallic resonator or to an "inverse" or "negative" dog bone in case of a resonator aperture. Each of the central portion and the end portions can be at least approximately rectangular. The central portion is elongate, which means that its dimension along one direction is greater than its dimension along the other direction. Each of the end portions is connected to one end of the central portion and extends to either side along the second direction. Also, each and portion is normally elongate along the direction along which it extends.

Since the resonator structures need to be smaller than a wavelength of the radar signals in order to function as parts of a metasurface, it is preferred that a maximum lateral dimension of each resonator structure is less than 2 mm. In the above-mentioned embodiment, if the central portion is elongate along the first direction, this maximum lateral dimension may be the dimension of the central portion along the first direction. On the other hand, it is preferred that a minimum lateral dimension of each resonator structure is at least 80 µm. The above-mentioned embodiment, this may be the dimension of an end portion along the first direction, i.e. its "width". Smaller structures are usually not easy to produce by standard PCB manufacturing techniques and would unnecessarily increase the production costs of the transmit array.

The transmit array and the antenna arrangement may be at least partially disposed inside a plastic housing. In particular, they may entirely be disposed in the plastic housing. Thus, they can be part of a radar module that can be easily handled during installation into the vehicle without the risk of damaging the electronic components. It is also conceivable that at least parts of the control unit are integrated in the plastic housing. The plastic housing may comprise at least two parts that are preferably connected by a moisture-tight and dust-tight process like gluing, ultrasonic welding or laser welding. It is conceivable that before the two parts are assembled, the transmit array is permanently connected to a first part, either by gluing or by molding the first part around the transmit array. An electronic module may comprise the antenna arrangement and possibly components of the control unit, all of which can be disposed on a single PCB. The electronic module can then be connected to the first part, by gluing or other suitable processes, so that the antenna arrangement is disposed in a suitable position with respect to the transmit array. For instance, at least one antenna can be disposed at a distance corresponding to a focal length as mentioned above. Then, when the electronic module is in place, the second part can be connected to the first part, thereby closing the plastic housing. In order to minimize interference of the plastic housing with the transmission field and the response field, the plastic material should have a low permittivity $\in_{r,h}$ (the index "h" referring to "housing").

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
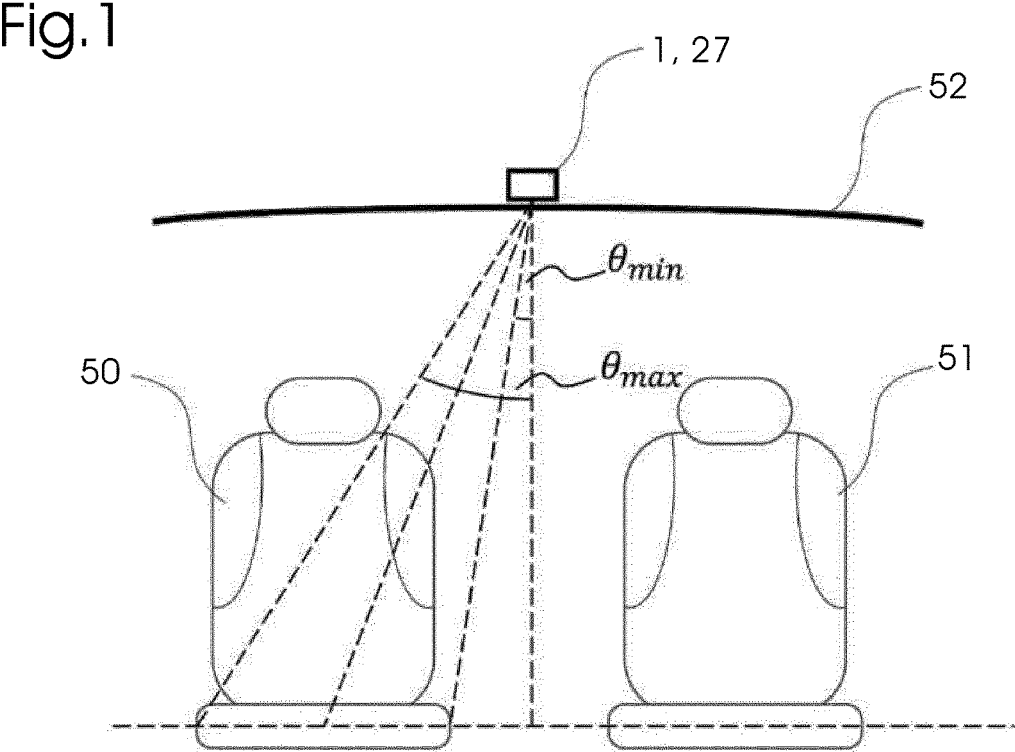
FIG. 1 is a schematic front view of a vehicle with an embodiment of an inventive occupancy detection system.
Figure 2:
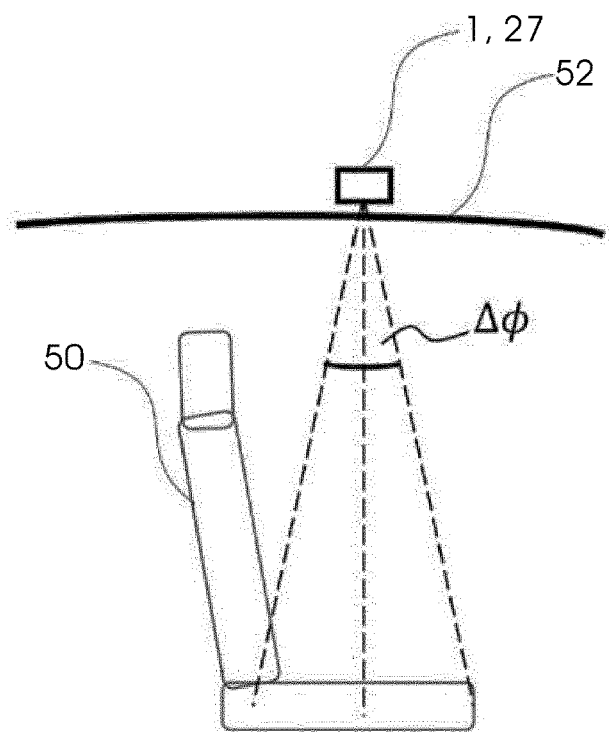
FIG. 2 is a schematic side view of the vehicle from FIG. 1.

FIGS. 1 and 2 schematically show a vehicle with an embodiment of an inventive occupancy detection system, designated at 1. The system 1 is installed in a ceiling 52 of the vehicle. In this example, the system 1 is configured to detect the occupancy of two vehicle seats 50, 51, but it could be adapted for a higher number of seats. Furthermore, a classification of occupants can be performed. By way of example, the area to be surveilled by the system 1 can be described by a Minimum azimuth angle $\theta_{min}$ of 5.5°, a maximum azimuth angle $\theta_{max}$ of 38° and an elevation angle $\Delta\phi$ of 30°.

Figure 3:
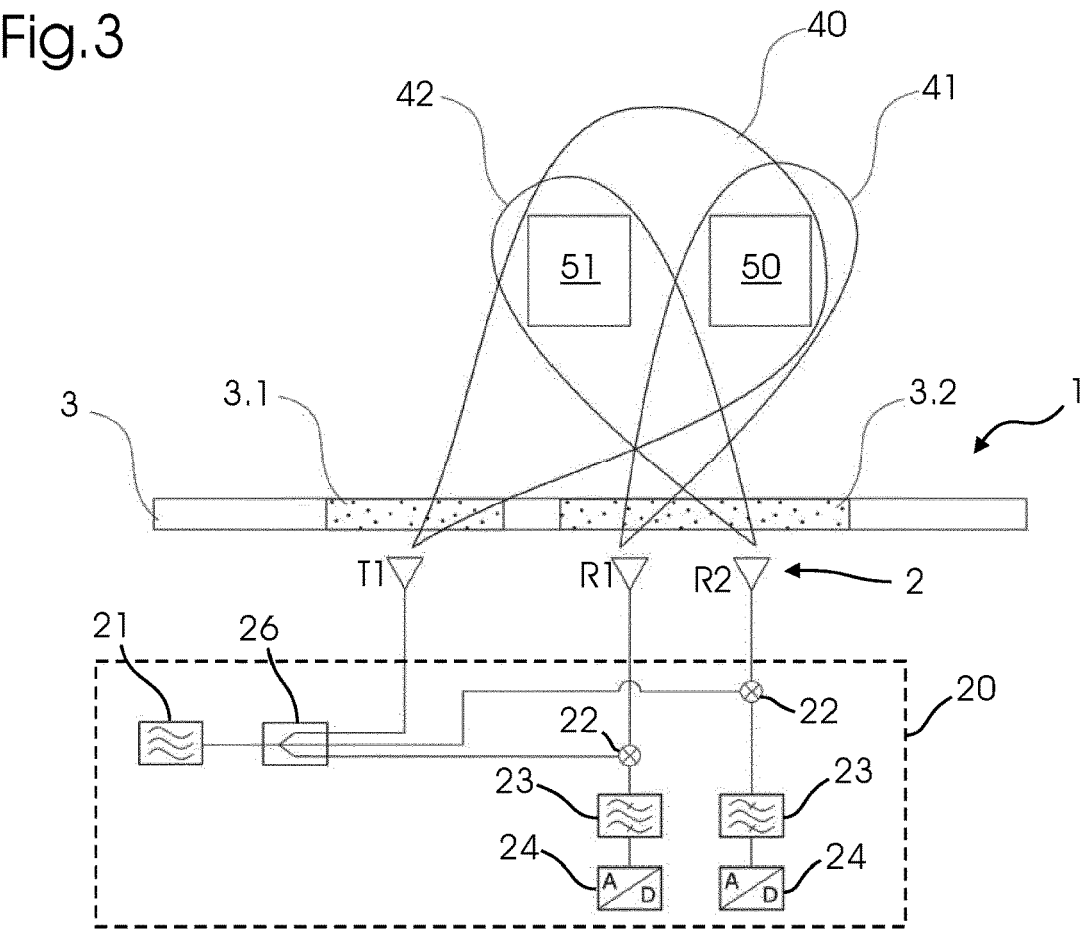
FIG. 3 is a block schematic of the occupancy detection system from FIG. 1 and vehicle seats.

FIG. 3 shows a block schematic of the system 1. In this example, it comprises an antenna arrangement 2 with a transmit antenna T1 and two receive antennas R1, R2. Generally, the number of receive antennas R1, R2 should be equal or greater than the number of seats 50, 51 to be detected. The antennas T1, R1, R2 are relatively small and non-directive (e.g. patch antennas or the like). They are connected to a control unit 20, which is adapted to apply a radio-frequency transmission signal to the transmit antenna T1 and to receive a response signal from each of the receive antennas R1, R2. In the simplest case, the transmission signal is implemented as a continuous wave signal with a frequency of 80 GHz, but it could also be e.g. a frequency-modulated signal or a pulse signal. The control unit 20 comprises a radio frequency generator 21, which is connected via a power divider 26 to the transmit antenna T1 and to an input of each of two mixers 22. The other input of each mixer 22 is connected to a receiver antenna R1, R2, while its output is connected to a band pass filter 23, which in turn is connected to an A/D converter 24 (analog-to-digital converter). Each A/D converter 24 can be connected to additional components for processing and evaluating the digital signal, which are not shown here for sake of simplicity.

The system further comprises a transmit array 3 interposed between the antenna arrangement 2 and the vehicle seats 50, 51. It comprises a transmit section 3.1 through which the transmit antenna T1 transmits a transmission field 40 in response to the transmission signal. The transmission field 40, which of course is a radio-frequency electromagnetic field, covers both vehicle seat 50, 51. A portion of the transmission field 40 is reflected as a first response field 41 and a second response field 42, respectively. Each response field 41, 42 is transmitted through a receive section 3.2 of the transmit array 3 and reaches the first and second receive antenna R1, R2, respectively. It should be noted that the shape of the transmission field 40 and the response fields 41, 42 shown in FIG. 3 does not represent the actual field distribution but is to be understood as schematic.

The transmit array 3 is designed to influence the radiation pattern by refracting each of the radar fields 40, 41, 42. For the transmission field 40, the refraction through the transmit section 3.1 is such that both vehicle seats 50, 51 can be covered. For each of the response fields 41, 42, the refraction is such that only reflections from the first vehicle seat 50 reach the first receive antenna R1, while only reflections from the second vehicle seat 51 reach the second receive antenna R2. One could also say that the field of view of the transmit antenna T1 covers both seats 50, 51, while the field of view of each receiving antenna R1, R2 concentrates on each one of the seats 50, 51 and their mutual overlap is minimal. Thus, each of the response signals corresponds to one of the seats 50, 51.

Figure 4:
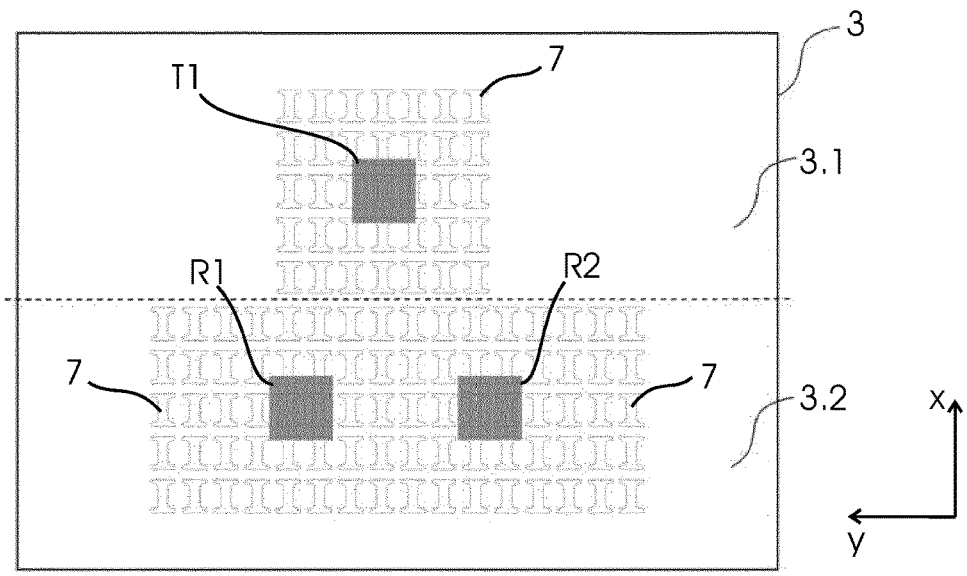
FIG. 4 shows a transmit array of the occupancy detection system from FIG. 1.
Figure 5:
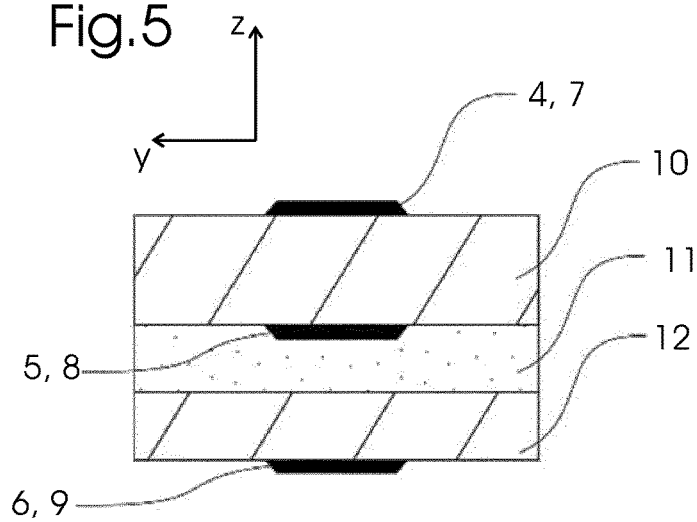
FIG. 5 is a sectional view of a cell of the transmit array from FIG. 4.
Figure 6:
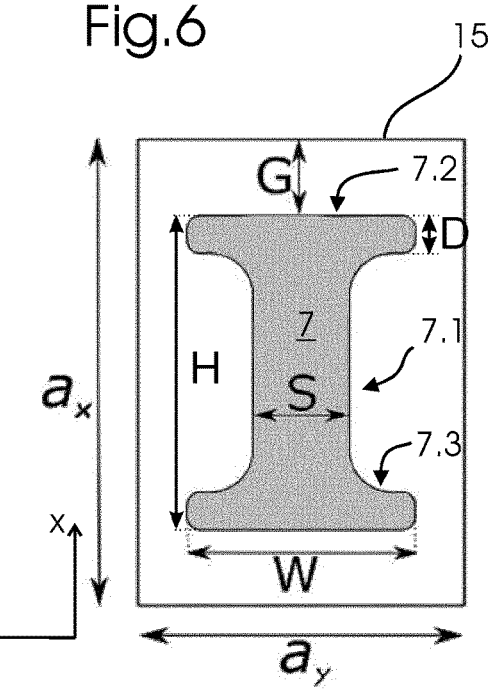
FIG. 6 is a top view of the cell from FIG. 5.
Figure 7:
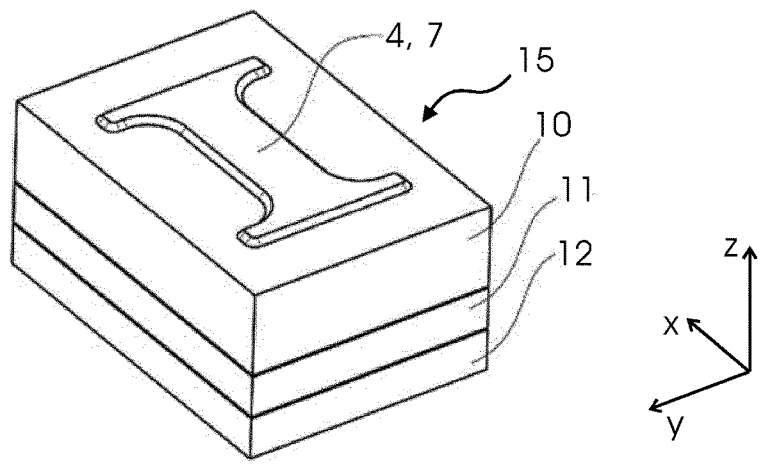
FIG. 7 is a perspective view of the cell from FIG. 5.

The transmit array 3 will now be described with reference to FIGS. 4 to 7. It is a multilayer structure that can be fabricated with standard printed circuit board (PCB) technology. The transmit array 3 has a length 26 mm along a first direction x and a width of 18 and mm along a second direction y. It consists of three structured metallic layers 4, 5, 6 disposed above each other (along a third (vertical) direction z), which are separated by dielectric layers 10, 11, 12. It comprises a transmit section 3.1 and a receive section 3.2. As can be seen in FIG. 4, the transmit antenna T1 is disposed over the transmit section 3.1 and each receive antenna R1, R2 is disposed over the receive section 3.2. Each section 3.1, 3.2 of the transmit array 3 consists of a nearly periodic pattern of cells 15 as shown in FIG. 6. Each cell 15 contains a metallic resonator 7, 8, 9 per metallic layer 4, 5, 6. The overall thickness of the layer stack up shown in FIGS. 5 and 7 is on the order of 500 μm and the permittivity of each dielectric layer 10, 11, 12 should be approximately $\in_{r,s}$=3.0. Common dielectric materials used for high frequency circuit fabrication with low dielectric losses can be used. The thickness of the metallic layers 4, 5, 6 can be 18 μm or smaller to achieve the required resolution of the PCB lithography process. In the embodiment shown, the second metallic layer 5 is separated from the third metallic layer 6 by two dielectric layers 11, 12, which have the same radio-frequency properties as the first dielectric layer 10 and are only generated separately for manufacturing reasons. They may also be regarded as sub-layers of a single dielectric layer.

Each cell 15 can achieve near unity transmission magnitude and a specific transmission phase response $\phi_i$ (i being the number of the respective cell). This required phase response $\phi_i$ may vary along the transmit array 3 and depends on the desired antenna radiation pattern. To achieve these required transmission properties, a combination of different synthesis techniques can be applied for each cell of the transmit array. As can be seen in FIGS. 6 and 7, the geometry of each resonator 7, 8, 9 is of the shape of a dog bone as reported e.g. by Lavigne et al. It comprises an elongate central portion 7.1 aligned along the first axis x and two end portions 7.2, 7.3 connected to the central portion 7.1 and aligned along the second direction y. To be compatible with PCB fabrication processes, lateral cell dimension ($a_x$, $a_y$) on the order of 1.4×0.8 mm are used. The geometrical dimensions (a spacing G, a first width S, a second width W, a first length H and a second length D as shown in FIG. 6) of each of these resonators 7, 8, 9 of one cell 15 can be determined e.g. with the design recipe from Epstein et al. The resulting geometrical dimensions from this recipe depend mainly on the required transmission phase $\phi_i$. The design method from Epstein et al. may however not be precise enough to achieve a desirable efficiency. Therefore, an optimization of the geometrical parameters of each cell 15 may be required and can be performed as described e.g. by Cole et al. and Olk et al. Normally, the first length H of a central portion 7.1 of the resonator 7 shown in FIG. 6 can be less than 1.0 mm, while the second length D of one end portion 7.2, 7.3 can be about 0.1 mm. Each cell comprises a top resonator 7, a middle resonator 8 and a bottom resonators 9. In particular, the size and shape of the top resonator 7 may be identical to those of the bottom resonator 9. It should be understood that the dimensions of one of these resonators, e.g. the top resonator 7, are generally different for different cells 15.

As mentioned above, the transmit array 3 comprises two different sections 3.1, 3.2. The transmit antenna T1 is located above the transmit section 3.1 and radiates almost solely through this area. Both receive antennas R1, R2 receive almost solely through the receive section 3.2. The required phase response of the resonators 7, 8, 9 in each section 3.1, 3.2 depends on the desired antenna radiation pattern. In this example, the transmit array 3 produces a near homogeneous phase profile for the transmit section 3.1. The receive section 3.2, on the other hand, requires a hyperbolic phase profile in the second direction y and a homogeneous phase profile the first direction x. Herein, "hyperbolic" means that the transmission phase through the transmit array 3 in the receive section 3.2 approximately equals $$\phi(y) = \frac{2\pi}{\lambda}\left(\sqrt{y^2 + f_{foc}^2} - f_{foc}\right) + A$$

where $\lambda$ is the wavelength of the transmitted signal, $f_{foc}$ is a focal length of the receive section 3.2 and A is an arbitrary constant which can be chosen conveniently during the design of the transmit array 3. The number of cells in the first direction x direction corresponds to the width of the field of view in elevation direction $\Delta\phi$.

Figure 8:
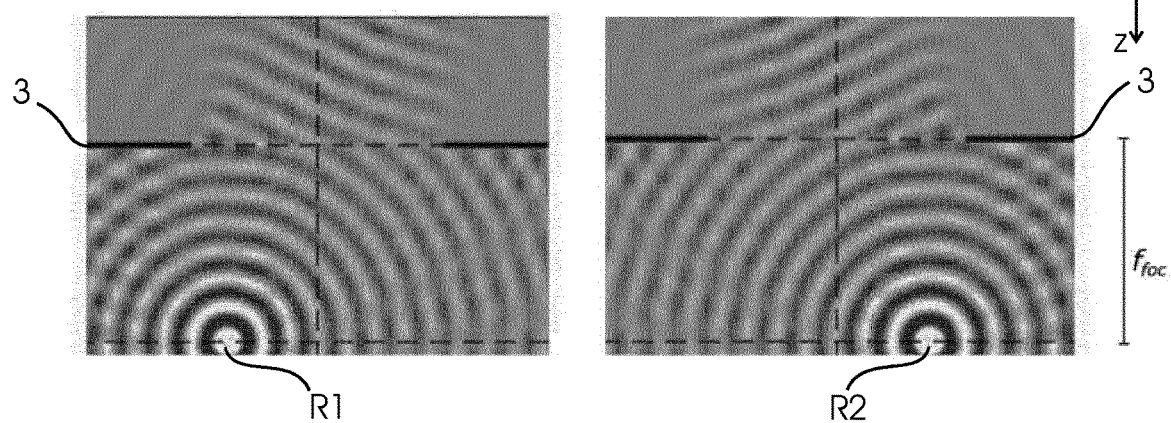
FIG. 8 is a diagram illustrating the radiation characteristics of receiving antennas of the occupancy detection system of FIG. 1.
Figure 9:
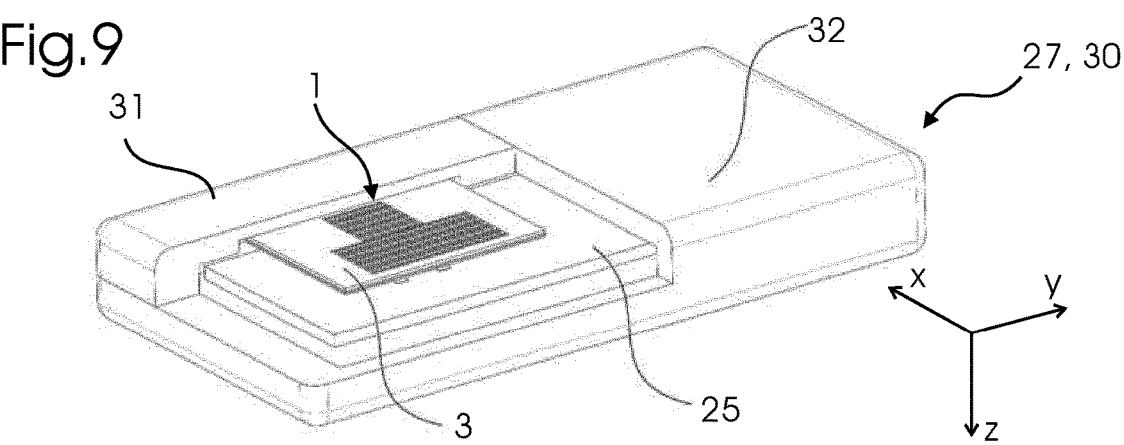
FIG. 9 is a cutaway view of a radar module with the occupancy detection system.
Figure 10:
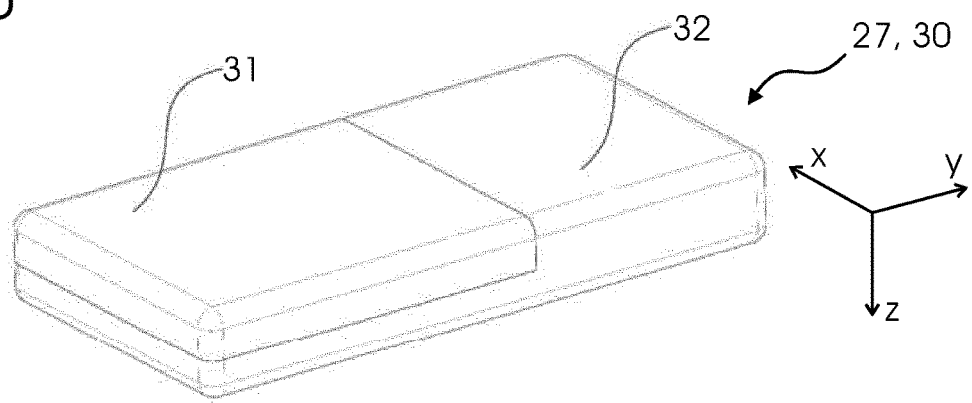
FIG. 10 is a perspective view of the radar module from FIG. 9.

In FIG. 8, the transmission through the receive section 3.2 of the transmit array 3 is described in more detail. Specifically, the radiation characteristics of the receive section 3.2 is illustrated. I.e., FIG. 8 shows a simulated electric field for a (theoretical) scenario where this receive section 3.2 is used as a "transmit section" and the receive antennas R1, R2 are operated as "transmit antennas". This situation is easier to simulate and allows to qualitatively assess the actual situation where the receive antennas R1, R2 are operated to receive the response signal. As the phase profile in this section is hyperbolic, it acts as a lens and the abovementioned focal length $f_{foc}$ can be assigned, which in this case is 20 mm. The receiving antennas R1, R2 are located at a distance of approximately $f_{foc}$ to the center of the lens in a way that the radiation pattern matches the required angle for detecting the seats 50, 51. In other words, the transmit array 3 and more particularly the receive section 3.2 is configured to focus the first response field 41 onto the location of the first receive antenna R1 and the second response field 42 onto the location of the second receive antenna R2.

Figure 11:
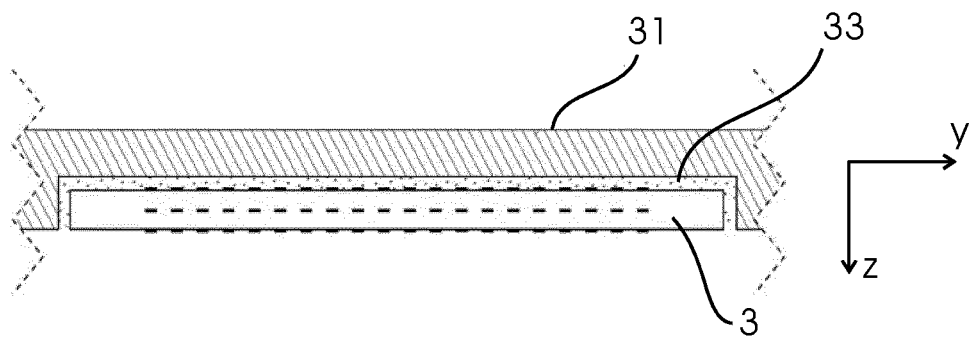
FIG. 11 is a sectional view of a top part of the radar module from FIG. 9 according to a first embodiment.
Figure 12:
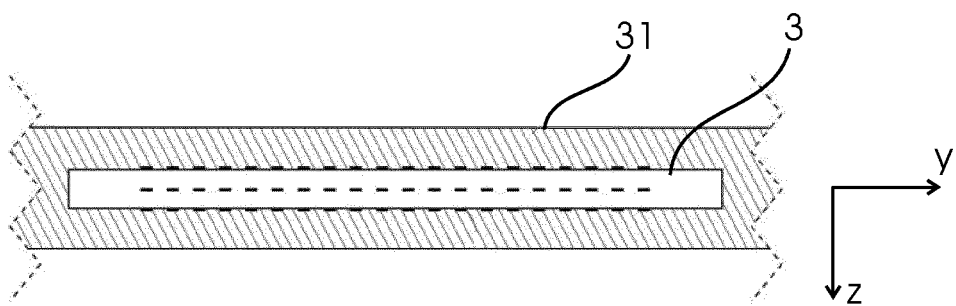
FIG. 12 is a sectional view of a top part of the radar module from FIG. 9 according to a second embodiment.

The integration of the system 1 into a closed plastic housing 30 of a radar module 27 is described with respect to FIGS. 9 to 12. The housing 30 consists of at least two parts 31, 32 which are connected. A connection process like ultrasonic welding or laser welding can be used to ensure that the seal is dust-tight and the sensitive electronic components inside are protected. The transmit array 3 is glued to a top part 31 of the housing 30. This top part 31 preferably consists of a material with a low permittivity $\epsilon_{r,h}$. All other components of the system 1, including the antenna arrangement 2 and the control unit 20 are mounted on a circuit board 24 which is clamped into the housing 30 close to a bottom part 32 so that the receive antennas R1, R2 are at a distance of $f_{foc}$ from the transmit array 3. Concerning the connection of the transmit array 3 and the top part of the housing 30, two embodiments are disclosed in FIG. 11 and FIG. 12, respectively. As shown in FIG. 11, the transmit array 3 can be glued to the inner surface of the upper part 31 with a thin layer of adhesive 33. Alternatively, the transmit array 3 can be embedded into the upper part 31 during the injection molding process as in FIG. 12. The second solution can be beneficial as no additional material or layer needs to be considered to achieve the desired high frequency properties.

Figure 13:
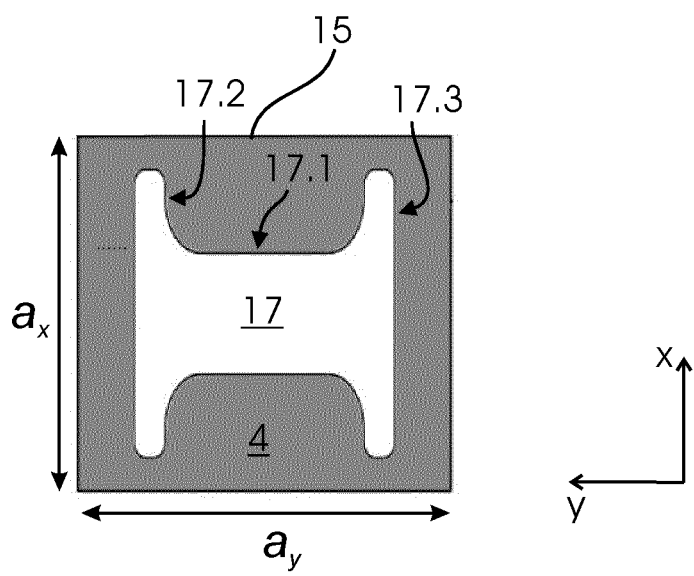
FIG. 13 is a top view of a cell according to another embodiment.

FIG. 13 is a top view of a cell 15 according to another embodiment. The lateral cell dimension ($a_x$, $a_y$) are not necessarily shown to scale and could e.g. also be on the order of 1.4×0.8 mm. In this embodiment, the top metallic layer 4 is coherent, but comprises a plurality of resonator apertures 17, namely one for each cell 15. The middle metallic layer 5 and the bottom metallic layer 6 comprise similar apertures. In particular, the size and shape of the resonator aperture 17 of the top metallic layer 4 may be identical to the resonator aperture of the bottom metallic layer 6. It should be understood that the dimensions of one of these resonator apertures, e.g. the top resonator aperture 17, are generally different for different cells 15. The general shape of the resonator aperture 17 resembles a dog bone (or an "inverted" or "negative" dog bone). The geometrical dimensions of the resonator aperture depend on the required transmission phase $\phi_i$ and can be determined e.g. with one of the design methods described by Epstein et al., Cole et al. or Olk et al. Like the metallic resonator shown in FIGS. 6 and 7, the resonator aperture 17 comprises a central portion 17.1 and two end portions 17.2, 17.3. In contrast to the metallic resonator 7 shown in FIG. 6 and 7, however, the central portion 17.1 is aligned along the second direction y, while the end portions 17.2, 17.3 are aligned along the first direction x.

The invention claimed is:

1. An occupancy detection system for at least one vehicle seat, the system comprising:
   an antenna arrangement, comprising at least one transmit antenna and at least one receive antenna;
   a control device adapted to apply a radio-frequency transmission signal to the antenna arrangement and to receive a response signal from antenna arrangement; and
   a transmit array comprising a plurality of structured metallic layers disposed above each other and extending laterally, each two neighbouring metallic layers isolated from each other by an intermediate dielectric layer, the transmit array being spaced a distance from the antenna arrangement and interposed between the antenna arrangement and the at least one vehicle seat,
   wherein the antenna arrangement is adapted to transmit a radio-frequency transmission field through the transmit array onto the at least one vehicle seat in response to the transmission signal and to receive a radio-frequency response field through the transmit array to generate the response signal, and the transmit array is adapted to refract at least one of the transmission field and the response field and
   wherein the transmit array comprises at least one receive section adapted to focus a response field from a position of a vehicle seat to a position of a receive antenna.

2. The occupancy detection system according to claim 1, wherein the transmit array comprises at least one transmit section laterally offset from said at least one receive section, wherein said at least one transmit antenna is disposed over a transmit section and adapted to transmit the transmission field therethrough and said at least one receive antenna is disposed over a receive section and adapted to receive the response field therethrough.

3. The occupancy detection system according to claim 1, wherein the control device is adapted to apply a transmission signal to each transmit antenna and receive a response signal from each receive antenna.

4. The occupancy detection system according to claim 1, wherein the transmission signal is a continuous-wave signal, a frequency-modulated signal or a modulated pulse signal.

5. The occupancy detection system according to claim 1, wherein the occupancy detection system is adapted for occupancy detection in a plurality of seats and comprises a number of antennas that is greater than a number of seats.

6. The occupancy detection system according to claim 1, wherein each metallic layer extends laterally along a first direction and a second direction perpendicular to the first direction and comprises a plurality of resonator structures, each two neighbouring resonator structures being spaced-apart along at least one of the first direction and the second direction.

7. The occupancy detection system according to claim 6, wherein each resonator structure is a metallic resonator or a resonator aperture in a coherent metallic layer.

8. The occupancy detection system according to claim 1, wherein the transmit array comprises a plurality of cells offset from each other, each cell comprising a top resonator structure, a middle resonator structure, and a bottom resonator structure disposed above each other.

9. The occupancy detection system according to claim 8, wherein a lateral dimension of each cell along each of a first direction and a second direction is between 600 µm and 2.5 mm.

10. The occupancy detection system according to claim 8, wherein, in each cell, a shape and size of the top resonator structure and the bottom resonator structure are identical.

11. The occupancy detection system according to claim 8, wherein at least two vehicle seats are offset along one of a first direction and a second direction and at least one dimension of one resonator structure varies for different cells along this direction.

12. The occupancy detection system according to claim 8, wherein every resonator structure comprises an elongate central portion aligned along one of a first direction and a second direction and two end portions connected to the central portion and aligned along the other direction.

13. The occupancy detection system according to claim 8, wherein a maximum lateral dimension of each resonator structure is less than 2 mm and a minimum lateral dimension of each resonator structure is at least 80 µm.

14. The occupancy detection system according to claim 1, wherein the transmit array and the antenna arrangement are at least partially disposed inside a plastic housing.

* * * * *